(12) United States Patent
Guidi

(10) Patent No.: US 10,899,267 B2
(45) Date of Patent: Jan. 26, 2021

(54) CLOSE-IN ILLUMINATION MODULE

(71) Applicant: Waymo LLC, Mountain View, CA (US)

(72) Inventor: Giulia Guidi, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 16/726,489

(22) Filed: Dec. 24, 2019

(65) Prior Publication Data

US 2020/0207252 A1 Jul. 2, 2020

Related U.S. Application Data

(60) Provisional application No. 62/785,038, filed on Dec. 26, 2018.

(51) Int. Cl.
*B60Q 1/00* (2006.01)
*B60R 11/04* (2006.01)
*G03B 15/02* (2006.01)
*G01S 7/481* (2006.01)

(52) U.S. Cl.
CPC ............ *B60Q 1/0023* (2013.01); *B60R 11/04* (2013.01); *G03B 15/02* (2013.01); *G01S 7/4815* (2013.01)

(58) Field of Classification Search
CPC ....... B60Q 1/0023; B60R 11/04; G03B 15/02; G01S 7/4815
See application file for complete search history.

(56) References Cited

U.S. PATENT DOCUMENTS

| 9,227,555 B2 | 1/2016 | Kalapodas |
| 9,669,755 B2 | 6/2017 | Naik et al. |
| 9,955,559 B2 | 4/2018 | Engelen et al. |
| 2008/0279541 A1 | 11/2008 | Montgomery et al. |
| 2012/0188287 A1 | 7/2012 | Wurzel et al. |
| 2014/0303853 A1* | 10/2014 | Itoh ........................ B60R 11/04 701/49 |
| 2016/0047888 A1 | 2/2016 | Roberts |
| 2017/0104939 A1 | 4/2017 | Sun |

(Continued)

OTHER PUBLICATIONS

International Searching Authority, International Search Report and Written Opinion dated Apr. 27, 2020, issued in connection with International Patent Application No. PCT/US2019/068479, filed on Dec. 24, 2019, 11 pages.

*Primary Examiner* — Jimmy T Vu
(74) *Attorney, Agent, or Firm* — McDonnell Boehnen Hulbert & Berghoff LLP

(57) ABSTRACT

The present disclosure relates to optical systems, vehicles, and methods that are configured to illuminate and image a wide field of view of an environment. An example optical system includes a camera having an optical axis and an outer lens element disposed along the optical axis. The optical system also includes a plurality of illumination modules, each of which includes at least one light-emitter device configured to emit light along a respective emission axis and a secondary optical element optically coupled to the at least one light-emitter device. The secondary optical element is configured to provide a light emission pattern having an azimuthal angle extent of at least 170 degrees so as to illuminate a portion of an environment of the optical system.

20 Claims, 9 Drawing Sheets

(56) References Cited

U.S. PATENT DOCUMENTS

2018/0229645 A1    8/2018   Hara et al.
2018/0255622 A1    9/2018   Spero
2018/0302611 A1   10/2018  Baak et al.
2019/0098185 A1*  3/2019   Kadomae ............... G03B 15/03

* cited by examiner

CLOSE-IN ILLUMINATION MODULE

CROSS-REFERENCE TO RELATED APPLICATIONS

The present application is a patent application claiming priority to U.S. Patent Application No. 62/785,038 filed Dec. 26, 2018, the contents of which are hereby incorporated by reference.

BACKGROUND

Conventional imaging systems can be configured to acquire electronic motion pictures. Such imaging systems can include video cameras, smartphones, web cams, digital single lens reflex (DSLR) cameras with video capabilities, etc.

In some scenarios, such imaging systems can be used in conjunction with artificial light sources. Such artificial light sources could serve as a primary or secondary light source in a given scene. Artificial light sources could include intermittent (e.g., an electronic flash unit) and/or continuous light sources (e.g., a light emitting diode panel).

SUMMARY

The present disclosure generally relates to imaging systems with illumination modules configured to provide properly-illuminated images over a wide field of view.

In a first aspect, an optical system is provided. The optical system includes at least one camera. The at least one camera includes an optical axis and an outer lens element disposed along the optical axis. The optical system also includes a plurality of illumination modules. Each illumination module includes at least one light-emitter device configured to emit light along a respective emission axis and a secondary optical element optically coupled to the at least one light-emitter device. The secondary optical element is configured to provide a light emission pattern having an azimuthal angle extent of at least 170 degrees so as to illuminate a portion of an environment of the optical system.

In a second aspect, a vehicle is provided. The vehicle includes a camera. The camera includes an optical axis and an outer lens element disposed along the optical axis. The vehicle also includes a first illumination module configured to illuminate a first portion of an environment of the vehicle and a second illumination module configured to illuminate a second portion of the environment of the vehicle. Each illumination module includes at least one light-emitter device configured to emit light along a respective emission axis. The illumination modules also include a secondary optical element optically coupled to the at least one light-emitter device. The secondary optical element is configured to provide a light emission pattern having an azimuthal angle extent of at least 170 degrees so as to illuminate a portion of an environment of the vehicle.

In a third aspect, a method is provided. The method includes causing at least one light-emitter device of at least one illumination module of a vehicle to emit light into an environment according to a light emission pattern. The at least one light-emitter device is configured to emit light along an emission axis. The at least one light-emitter device is optically coupled to a secondary optical element. The secondary optical element is configured to interact with the emitted light so as to provide a light emission pattern. The light emission pattern includes an azimuthal angle extent of at least 170 degrees. The method also includes causing a camera of the vehicle to capture at least one image of the portion of the environment. The camera includes an optical axis and an outer lens element disposed along the optical axis. The at least one light-emitter device is coupled to the camera by way of a modular attachment structure configured to interchangeably couple the plurality of illumination modules to the camera such that each respective emission axis forms a non-zero tilt angle with respect to the optical axis. An illumination intensity is at least 70% uniform within a field of view of the camera at a predetermined distance.

Other aspects, embodiments, and implementations will become apparent to those of ordinary skill in the art by reading the following detailed description, with reference where appropriate to the accompanying drawings.

DETAILED DESCRIPTION

Figure 1:
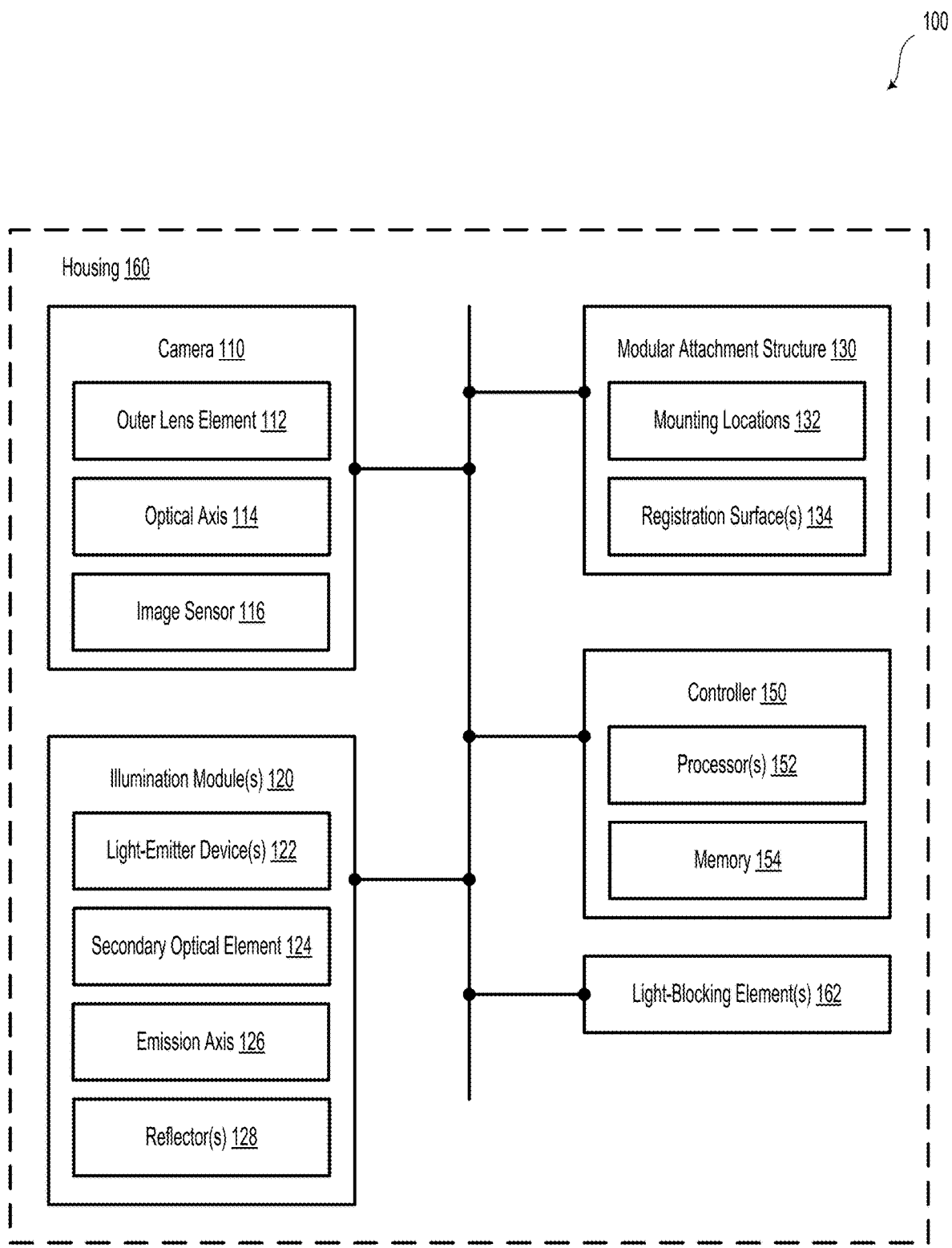
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure relates an optical system that includes a camera and an illumination module. In some embodiments, the optical system could be used in conjunction with semi- or fully-autonomous vehicles. However, other imaging applications are contemplated within the scope of the present disclosure.

In some embodiments, the camera could include an image sensor. The image sensor could be, for example, an APS-C format sensor. Other sensor size formats are possible and contemplated.

The illumination module could be configured to emit light towards an environment. For example, the illumination module may include one or more light-emitter devices and could be utilized to uniformly illuminate a scene at close range (e.g., up to 3 meters away). Such a system could be operable to provide illumination to, and imaging of, a scene so as to be able to detect and classify objects in low ambient light conditions. In some embodiments, the optical system could be configured to classify relatively small objects (e.g., 30-50 cm or less in height) at a range of approximately 3 meters away from the optical system. As an example of a real world application, an optical system could be configured to detect pedestrians, bicyclists, etc. and other objects near the optical system, under various lighting conditions, including night scenarios.

In the vehicle context, several optical systems (illumination modules and cameras) can be disposed on a given vehicle at different locations and/or different orientations so as to cover a full 360 degree azimuthal field of view without any occlusions. For example, two optical systems, each having a 190 degree azimuthal field of view, could be arranged on the vehicle (e.g., one optical system per side) to cover the full azimuthal field of view around the vehicle.

In some embodiments, the optical systems could be between 50-100 millimeters by 20-50 millimeters in length and width or vice versa. The optical systems could have a depth of approximately 20-50 millimeters. It will be understood that the optical system could have a different size in one or more dimensions.

The light-emitter devices could include devices configured to emit light in the infrared (e.g., 800-1000 nanometers), ultraviolet, and/or visible wavelengths. The light-emitter devices could include laser diodes, vertical cavity surface-emitting lasers (VCSELs), and/or light-emitting diodes (LEDs). However, other types of light-emitters are contemplated and possible. In some embodiments, the light-emitter devices could include a secondary optical element (e.g., a lens) configured to shape, focus, or otherwise modify characteristics of the emission light (e.g., light pattern, light intensity, wavelength, etc.). In some embodiments, the secondary optical element could include a refractive or diffractive optic element configured to broaden the emission light pattern. For example, in some scenarios, a LED could be configured to emit light within a cone having an extent of 130 degrees in azimuth. In such scenarios, the secondary optical element could be configured to spread or diffuse the emission cone to have an extent of 170 degrees in azimuth or more.

In some embodiments, each illumination module could include one or more LEDs. In such scenarios, at least one LED could be operable to emit visible light and at least one LED could be operable to emit infrared light or another wavelength not in the visible wavelengths. In some embodiments, the light-emitter devices could be configured to provide intermittent illumination. In other embodiments, the light-emitter devices could be configured to provide continuous light to the scene.

The illumination module could include light-emitter devices that are angled away from an optical axis of the camera. For example, in some embodiments, an emission axis of one or more light-emitter devices could form a 5-20 degree angle away from the optical axis of the camera. In some embodiments, a plurality of light-emitter devices could be disposed at approximately equal intervals around the optical axis of camera. For example, two light-emitter devices could be disposed approximately 10 millimeters from the optical axis of the camera, one on each side of an outer surface of the camera (e.g., to the right and left of the camera, or above and below the camera). In some embodiments, the light-emitter devices could partially or completely surround and/or encircle an outer portion of the camera (e.g., a lens opening).

In some embodiments, the light-emitter devices could be recessed with respect to an outer extent (e.g., outer/final camera lens element). For example, the light-emitter device could be recessed between 5 millimeters and 20 millimeters from the final camera lens element. In some embodiments, the light-emitter devices and/or the illumination module could include a flat or curved outer window so as to ease cleaning and/or improve durability. The outer window could include a hydrophilic or hydrophobic coating.

Such an arrangement of the light-emitter devices with respect to the camera could improve uniformity of the illumination within a given scene. Furthermore, such arrangements may reduce or eliminate the amount of stray light, which can reduce the performance of the camera. For example, no light rays emitted from the light-emitter devices directly enter the camera.

In some embodiments, the one or more illumination modules could be coupled to the camera by way of a modular attachment structure, which could include a bracket, slot, or another type of physical attachment structure configured to provide interchangeable replacement of the illumination module and/or the camera. In some embodiments, the illumination modules could be coupled to the left and right of the camera by way of the modular attachment structure. Additionally or alternatively, the modular attachment structure could be symmetric with respect to the camera lens opening. That is, illumination modules could be attached to the modular attachment structure in an interchangeable fashion. That is, a single illumination module could optionally be coupled to the modular attachment structure in a plurality of different locations with respect to the camera lens (e.g., right/left, right/left/top/bottom, etc.). The modular attachment structure could include, for example, a backplane attached to the camera and a plurality of attachment locations for illumination modules to attach to the modular attachment structure.

In some embodiments, the illumination module(s) and the corresponding light-emitter devices could be configured to emit light when the vehicle is operating at a speed below a predetermined low speed threshold. That is, the light-emitter devices could be configured to emit light when the vehicle is operating at low speeds (e.g., below 25 miles per hour). Additionally or alternatively, an operational mode of the illumination module and/or the light-emitter devices could be adjusted based on other considerations, such as vehicle energy usage and/or system temperature. For example, the illumination module could be disabled or operate at a lower temporal resolution when a system temperature is above a predetermined system temperature threshold. In some embodiments, the illumination could be at least 70% uniform across the field of view at a given range (e.g., 3 meters).

In some embodiments, the illumination module could operate in conjunction with various operations of the camera. For example, the illumination module could emit light only while the camera is actively capturing video. In other embodiments, the illumination module could emit intermittent light pulses in synchronization with one or more focal plane shutters associated with the camera.

II. Example Optical Systems

FIG. 1 illustrates an optical system 100, according to an example embodiment. The optical system 100 includes a camera 110. The camera 110 includes an optical axis 114 and an outer lens element 112 disposed along the optical axis 114. In an example embodiment, the camera 110 includes an image sensor 116, such as a focal plane array or another type of multi-element photodetector sensor. For example, the image sensor 116 could include a plurality of charge-coupled device (CCD) elements and/or a plurality of complementary metal-oxide-semiconductor (CMOS) elements. In some embodiments, the camera 110 could include a plurality of image sensors.

The image sensor 116 could be configured (e.g., sized or dimensioned) according to an image sensor format. For example, the image sensor 116 could include a full-frame (e.g., 35 millimeter) format sensor. Additionally or alternatively, the image sensor 116 could include "crop sensor" formats, such as APS-C (e.g., 28.4 mm diagonal) or one inch (e.g., 15.86 mm diagonal) formats. In an example embodiment, the image sensor could include a 1/2.8" format (e.g., ~6.5 mm diagonal). Other image sensor formats are contemplated and possible within the scope of the present disclosure. It will be understood that embodiments with multiple cameras and/or multiple image sensors are possible and contemplated within the context of the present disclosure.

The optical system 100 includes a plurality of illumination modules 120. Each illumination module 120 includes at least one light-emitter device 122 configured to emit light along a respective emission axis 126. The light-emitter device 122 could include a light-emitting diode, a diode laser, or another type of light source (e.g., an incandescent or fluorescent light source). The light-emitter device 122 could be configured to emit light in the infrared wavelength band as well as other wavelength bands (e.g., the visible spectrum (about 400-700 nanometers) and/or the ultraviolet spectrum (about 10-400 nanometers)). In some embodiments, the illumination modules 120 could be shaped like a ring, which could be arranged about the optical axis 114 of the camera 110 (e.g., similar to a ring light). In such scenarios, the respective light-emitter devices 122 associated with such a ring-shaped illumination module 120 could be arranged at various locations about the optical axis 114 of the camera 110. As will be described herein, other locations and/or arrangements of the illumination modules 120 and light-emitter devices 122 with respect to the camera 110 are possible and contemplated.

In some embodiments, the light-emitter device 122 could be configured to emit light at or around a wavelength of 850 nanometers. For example, the light-emitter device 122 could include an 850 nm LUXEON infrared LED (radiometric power of 1050 mW at 1000 mA). Such a light-emitter device 122 could have a beam divergence angle of approximately 150 degrees. As an example, the light-emitter device 122 could include a surface mount package and could be approximately 5×5×1.6 mm in dimension. However, other package formats and device sizes are contemplated and possible.

Each illumination module 120 also includes a secondary optical element 124 optically coupled to the at least one light-emitter device 122. The secondary optical element 124 is configured to provide a light emission pattern having an azimuthal angle extent of at least 170 degrees so as to illuminate a portion of an environment of the optical system 100. In some embodiments, the secondary optical element 124 could include a hemispherical or half-ball lens (e.g., Edmund TECHSPEC N-BK7 Half-Ball Lens). However, other types of diverging lenses are possible and contemplated. In some embodiments, the secondary optical element 124 could include a plano-convex lens, a prism lens, a cylindrical lens, a conical lens, and/or another type of non-hemispherical (e.g., oval) lens. Other custom secondary optical lenses are contemplated. Such custom secondary optical lenses could vary in diameter and shape, based on a desired horizontal field of view, a desired vertical field of view, and light emitter size.

In some embodiments, the illumination module(s) 120 could include one or more reflectors 128. The reflectors 128 could include, for example, one or more optically reflective surfaces configured to modify and/or enhance the as-emitted light emission pattern from the at least one light-emitter device 122. The reflectors 128 could include a surface coating of a highly reflective material, such as aluminum, gold, and/or chrome. In some embodiments, the reflectors 128 could be configured to improve light emission uniformity within the field of view of the camera 110 and/or increase or maximize the light intensity within the field of view. As an example, the reflectors 128 could include a three-dimensionally curved (e.g., parabolic) reflective surface arranged about the at least one light-emitter device 122. Additionally or alternatively, the reflectors 128 could include a reflective surface having a different shape.

Example embodiments may include different types of light-emitter devices 122, which may be utilized to obtain a desired spectral output from the illumination module 120. For example, infrared LEDs could be used in conjunction with visible LEDS of various colors (e.g., red, green, blue, among other possibilities). In such scenarios, the secondary optical element 124 could be configured to "mix" the various spectra of emitted light of the various light-emitter devices 122. In an example embodiment, the spectral emission, duty cycle, and/or emission intensity of light emitted by the illumination module 120 could be adjusted so as to achieve a desired spectral output characteristic that is observable by humans. For example, the desired spectral output characteristic could include that the emitted light from the illumination module 120 is observable by a human as being "white light". In such an embodiment, the spectral output of the illumination module 120 could be adjusted so as to avoid human observation of substantially only red light, which may be distracting and/or may connote an undesired signal (e.g., unintentionally signaling slowing or stopping) when observed by others in a driving scenario. That is, by "mixing" various colors of LEDs, the spectral output of the illumination module 120 can be adjusted to avoid inadvertent warning signals to other human drivers.

Additionally or alternatively, some embodiments may include incorporating one or more optical dyes into at least one of the light-emitter devices 122 or the secondary optical element 124. In some embodiments, the optical dye(s) could be dispersed within the secondary optical element 124 and/or coated onto one or more surfaces of the secondary optical element 124. The optical dye(s) could be configured to absorb light at a first optical wavelength and emit light at a second optical wavelength. As an example, the secondary optical element 124 could include a Lumogen perylene-based dye configured to downconvert light (e.g., UV light) into one or more wavelengths in the visible spectrum. Alternatively, conventional inorganic dyes or pigments, chromophores, and/or colorants are contemplated and possible relating to the present disclosure.

In some scenarios, the optical system 100 also includes a housing 160. The housing 160 could include the external surface of the optical system 100 and/or an external cover, a protective shell, and/or a coating. In some embodiments, the housing 160 could include an acrylic material formed in a sheet, dome, cylinder, or another shape. In some examples, an outer surface of each light-emitter device 122 is recessed between 0 millimeters and 50 millimeters with respect to a plane perpendicular to the optical axis 114 and that intersects the outer lens element 112 of the camera 110. By recessing the light-emitter device 122 with respect to the outer lens element 112, the amount of stray illumination light received by the camera 110 can be reduced.

In some examples, the system 100 could include one or more light-blocking elements 162. The light-blocking elements 162 could include, for example, baffles, ink, apertures, stops, or other optically-opaque structures. In example embodiments, the light-blocking elements 162 could be arranged inside and/or adjacent to the secondary optical element 124. For example, the blocking elements 162 could be arranged between the secondary optical element 124 and the camera 110. Among other possibilities, the blocking elements 162 could take the form of a lens hood around an outer lens element 112 of the camera 110. Other "go-between" or "gobo" arrangements of the blocking elements 162 with respect to the camera 110 and the light-emitter device 122 are possible and contemplated. In such scenarios, the blocking elements 162 could be configured to prevent light from the light-emitter device(s) 122 from directly entering the camera 110. Accordingly, the blocking elements 162 may help reduce or minimize lens flare, emission light "pollution", and optical ghosting, and/or otherwise improve image quality of the camera 110.

Figure 2A:
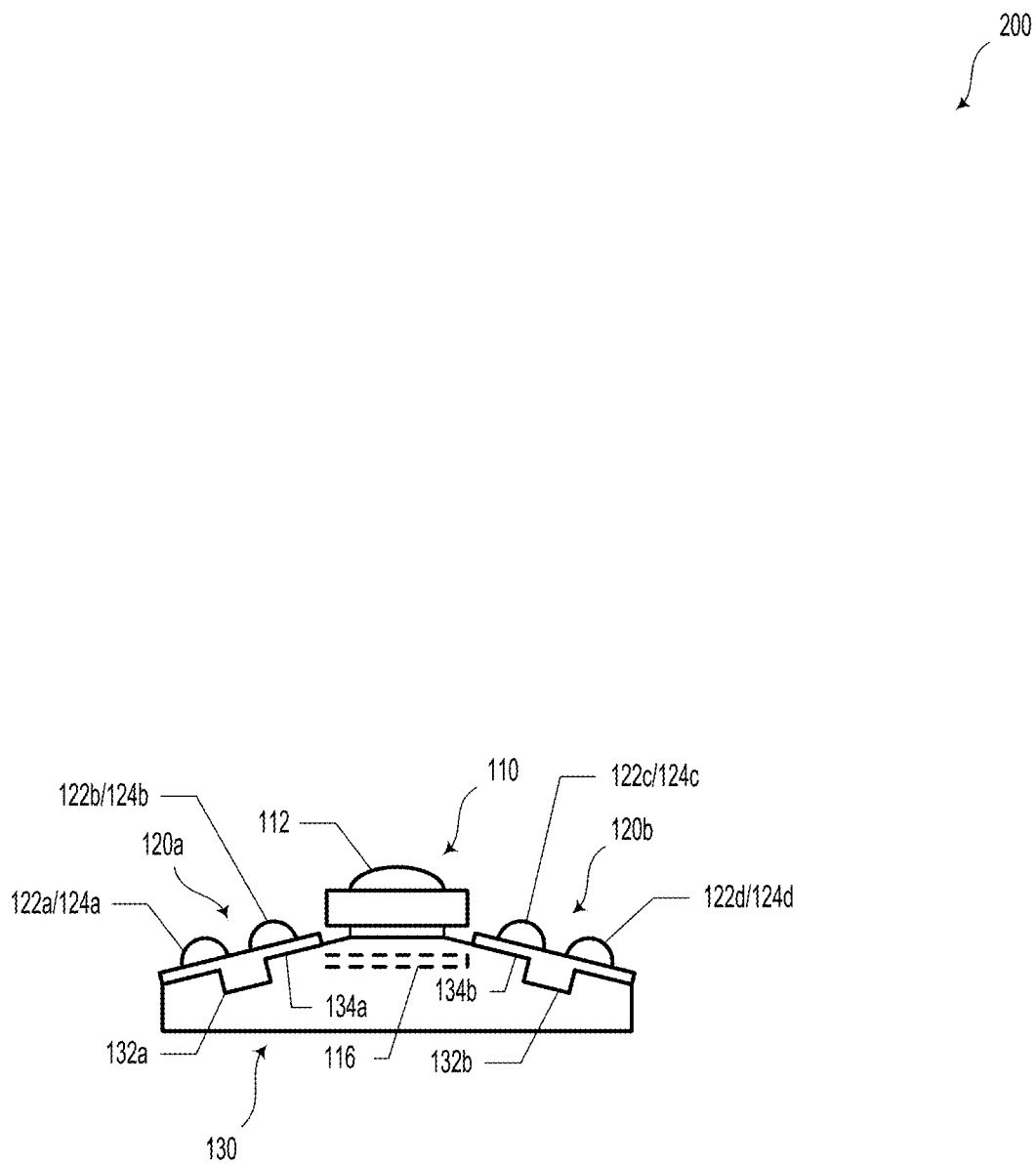
FIG. 2A illustrates an optical system, according to an example embodiment.
Figure 2B:
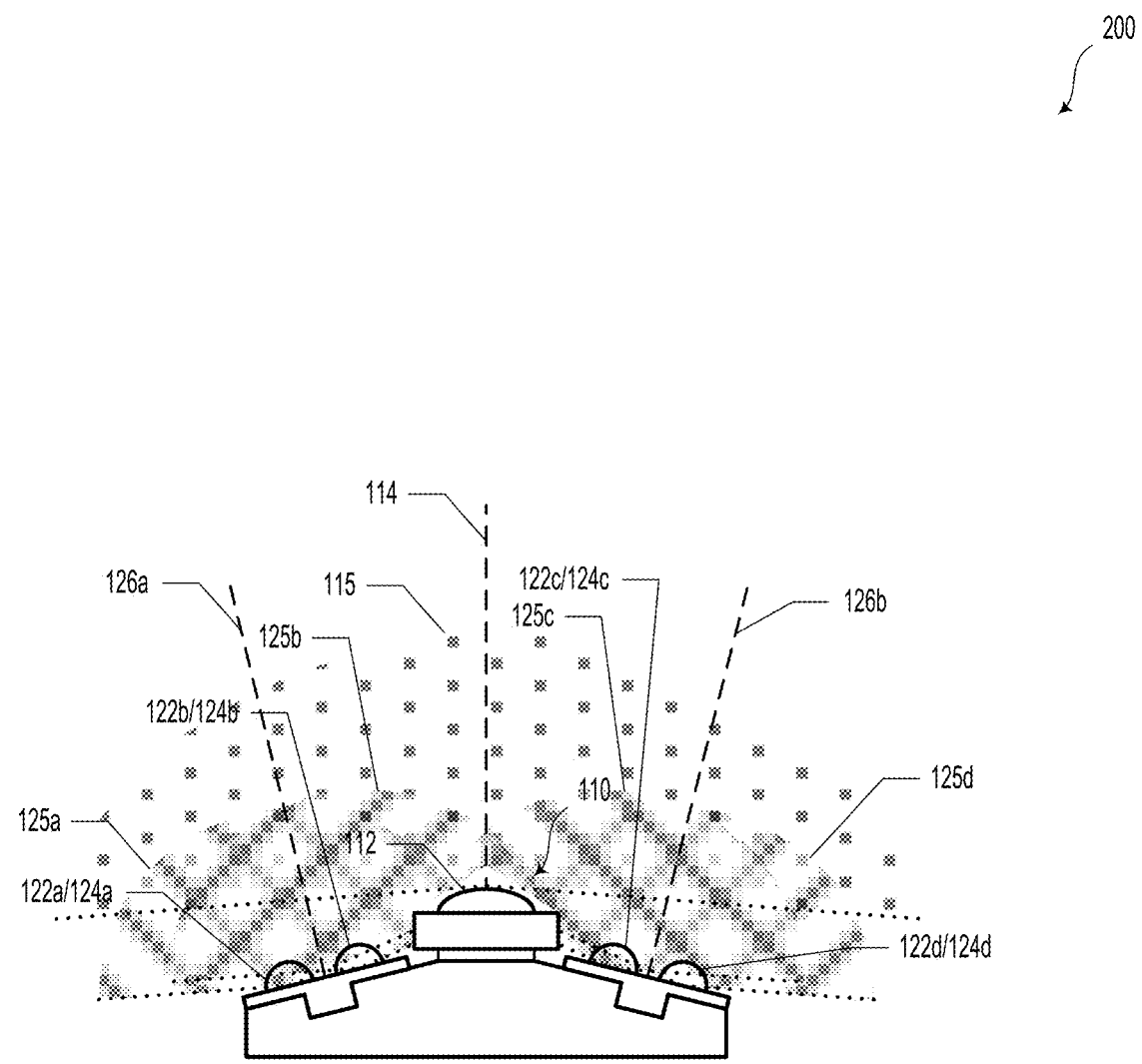
FIG. 2B illustrates the optical system of FIG. 2A, according to an example embodiment.

In some example embodiments, the plurality of illumination modules 120 could include a first illumination module and a second illumination module (e.g., first illumination module 120a and second illumination module 120b shown in FIGS. 2A and 2B). The first illumination module 120a and the second illumination module 120b could be arranged opposite one another with respect to the optical axis 114 of the camera 110 such that the respective emission axes 126a-b of the illumination modules 120a-b are tilted in opposite directions with respect to the optical axis. Put another way, the pointing angle of the camera 110 (e.g., optical axis 114) could be different than the pointing angles of the respective illumination modules 120 (e.g., emission axis 126a and emission axis 126b). While embodiments described herein include two illumination modules, which could be arranged to the left and right of the camera 110, it will be understood different numbers of illumination modules are possible and contemplated. For example, some embodiments may include four illumination modules, which could be respectively arranged to the left, right, above, and below the camera 110.

In some embodiments, the first illumination module 120a and the second illumination module 120b could each have a tilt angle with respect to the optical axis 114 that is within a range from 5 degrees to 20 degrees. That is, the respective emission axes 126a and 126b could be tilted between 5 and 20 degrees from the optical axis 114 of the camera 110. It will be understood that other tilt angles (e.g., between 0 and 30 degrees or between 10 and 45 degrees) are possible and contemplated. By angling the emission axes of the illumination modules away from the optical axis 114, the amount of stray illumination light received by the camera 110 can be further reduced.

In various embodiments, the light emission pattern could provide an illumination intensity that is at least 70% uniform within a field of view of the illumination modules (e.g., first illumination module 120a and/or second illumination module 120b) at a predetermined distance (e.g., 3 meters) from the optical system 100. In various examples, the predetermined distance could be, without limitation, a distance between 5 centimeters up to 50 meters. For example, the predetermined distance could be 3 meters, 10 meters, 30 meters, or another distance. In some embodiments, the illumination module 120 could be configured to emit light in a predetermined emission pattern. For example, the predetermined emission pattern may be selected or configured so as to compensate for light falloff in various optical elements in the optical system 100 (e.g., the outer lens element 112). In other words, illumination module 120 could emit light such that the relative illumination level is maintained at a substantially constant or equal amount across the field of view of the camera 110. In a specific example, in some embodiments, the outer lens element 112 of the camera 110 may transmit less light from the edges of the field of view as compared to the central portion of the field of view. Accordingly, the illumination module 120 could compensate for this effect by providing higher light intensity in regions near the edges of the field of view of the camera 110. Other types of predetermined emission patterns are possible and contemplated.

In some embodiments, the optical system could additionally include a modular attachment structure 130 configured to interchangeably couple the plurality of illumination modules 120 to the camera 110 such that each respective emission axis 126 forms a non-zero tilt angle with respect to the optical axis 114. In such scenarios, each illumination module (e.g., illumination modules 120a and 120b) of the plurality of illumination modules 120 is configured to interchangeably couple to each of a plurality of mounting locations 132 on the modular attachment structure 130. The modular attachment structure 130 includes at least one registration surface 134. The at least one registration surface 134 is configured to position an illumination module 120 according to at least one of: a known or desired orientation, a known or desired physical alignment position, and/or a known or desired optical alignment position. It will be understood that in some embodiments, illumination module 120a and illumination module 120b could be physically coupled and/or could be incorporated into a single illumination module. In scenarios involving a vehicle, the modular attachment structure 130 could attach directly to the vehicle. Additionally or alternatively, the modular attachment structure 130 could be a vehicle bracket or another type of vehicle structure.

In some examples, the modular attachment structure 130 could beneficially enable one or more of the illumination modules 120 to be interchangeably attached to the camera 110 in scenarios where an illumination module fails or if different types of illumination modules are needed. For example, illumination modules with different illumination intensity levels and/or different illumination patterns could be used in different imaging scenarios and/or applications.

Furthermore, in some embodiments, the modular attachment structure 130 could include one or more mounts to interchangeably attach a different camera 110. For example, different types and/or formats of cameras could be utilized based on a specific imaging scenarios and/or application.

For example, a camera with a wide horizontal (e.g., azimuthal angle) field of view (e.g., 190 degree cone angle) could be attached to the modular attachment structure 130 in a first scenario and a camera with a narrower horizontal field of view (e.g., a 120 degree cone angle) could be attached in a second scenario. It will be understood that utilizing cameras with different vertical (e.g., elevation angle) fields of view is also possible. Other ways to interchangeably couple different cameras 110 and/or different illumination modules 120 are possible.

In some scenarios, the optical system 100 also includes a controller 150. The controller 150 includes at least one of: a field-programmable gate array (FPGA), an application-specific integrated circuit (ASIC), or a light-emitting diode (LED) driver circuit. Additionally or alternatively, the controller 150 may include one or more processors 152 and a memory 154. The one or more processors 152 may be a general-purpose processor or a special-purpose processor (e.g., digital signal processors, etc.). The one or more processors 152 may be configured to execute computer-readable program instructions that are stored in the memory 154. As such, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of optical system 100. As such, the memory 154 may include program instructions to perform or facilitate some or all of the functionality described herein. The controller 150 is configured to carry out operations. In some embodiments, controller 150 may carry out the operations by way of the processor 152 executing instructions stored in the memory 154.

In some embodiments, the illumination modules 120 and the light-emitter devices 122 themselves could be controlled in various ways. For example, the illumination modules 120 and the light-emitter devices 122 could be synchronized with various operations of the camera 110. Additionally or alternatively, the illumination modules 120 and/or the individual light-emitter devices 122 could be operated in continuous (DC) mode or in pulsed mode. In such scenarios, the controller 150 could carry out operations so as to adjust one or more characteristics of the light emitted by the illumination modules 120.

The operations could include causing the at least one light-emitter device 122 of at least one illumination module 120 to emit light according to a light emission pattern. In such scenarios, the light includes light having a wavelength of substantially 850 nm (e.g., between 845 nm and 855 nm or between 840 nm and 860 nm). In some embodiments, the illumination module 120 could be configured to emit visible light (e.g., between 390 nm and 700 nm). Additionally or alternatively, the illumination module 120 could be configured to simultaneously emit both visible light and infrared light. Yet further, in some embodiments, the illumination module 120 could trigger the visible and infrared light emitter devices together (e.g., simultaneously or synchronously) or separately (e.g., asynchronously). Other light emission wavelengths and/or wavelength ranges are possible and contemplated.

In some embodiments, the operations could additionally include causing the camera 110 to capture at least one image of the portion of the environment. For example, the operations could include capturing a plurality of images using the camera 110 so as to provide information about the environment. In some embodiments, the images could be used to determine objects and/or obstacles within the environment.

Additionally or alternatively, the operations could include operating the optical system 100 in a first operating mode. In some embodiments, the first operating mode could include a "normal" or "standard" operating mode.

In such a scenario, the operations may include receiving information indicative of an operating temperature of the optical system 100. Such information could be obtained from a temperature sensor, such as a thermometer, a thermistor, a thermocouple, and/or a bandgap temperature sensor. In such scenarios, the temperature sensor could sense the temperature of the camera 110 and/or the illumination module(s) 120.

In such example embodiments, the operations could include determining that the optical system 100 is operating at an elevated temperature. For example, the elevated temperature could include an operating temperature of the optical system 100 being above a predetermined threshold temperature (e.g., 30° C., 40° C., 60° C., or another threshold temperature).

For example, the operations could include, in response to determining the optical system 100 is operating at an elevated temperature, operating the optical system 100 in a second operating mode. In other words, in scenarios where the optical system 100 is operating above a threshold temperature, the optical system 100 could be adjusted so as to operate in the second operating mode.

In such scenarios, operating the optical system 100 in the second operating mode could include operating the plurality of illumination modules 120 at a reduced illumination rate (e.g., 75%, 50%, or 25% of nominal pulse rate or duty cycle). In some embodiments, the duty cycle and/or onset of illumination of the illumination modules 120 could be varied based on an exposure time of the camera 110. For example, the duty cycle the illumination modules 120 could be synchronized to the exposure time and/or frame rate of the camera 110. In such scenarios, the duty cycle could be selected so as to avoid improperly- or insufficiently-lit images. Additionally or alternatively, the second operating mode could include operating the plurality of illumination modules 120 at a reduced illumination intensity (e.g., 50% of the illumination intensity provided during the first operating mode). Yet further, the second operating mode could include operating a reduced set of the plurality of illumination modules 120 and/or a reduced set of the plurality of light-emitter devices 122. In some embodiments, the second operating mode could include an operating mode that is configured to generate less heat than the first operating mode. For example, the illumination modules 120 could be operated so as to output less heat. In other embodiments, the second operating mode could include increasing the cooling rate of various thermal management devices, such as cooling fins, liquid cooling systems, heat sinks, etc.

In example embodiments, the operations could include synchronously operating the camera 110 and the plurality of illumination modules 120 based one or more focal plane shutter times associated with the camera 110. That is, the illumination modules 120 could be synchronized with the camera 110 so as to provide illumination substantially only while the shutter of the camera 110 is open—either physically or "digitally" during image capture. Additionally or alternatively, the illumination modules 120 could be synchronized with the camera 110 by the controller 150 and/or by an external computing device. In some embodiments, such synchronization could help avoid "rolling shutter" effects, where different portions of a given image are illuminated by vastly different light levels.

In cases where the illumination modules 120 are operated in synchronization with the camera 110, the respective image sensor 116 of the camera 110 could be a global shutter-type image sensor (e.g., an image sensor that captures light from an entire area of field of view simultaneously) or a rolling shutter-type image sensor (e.g., an image sensor that scans portions of the field of view in a sequential manner, such as in a line-by-line fashion). For global shutter-type image sensors, the illumination modules 120 could be triggered to illuminate the scene at the same time as the image capture is triggered at the image sensor 116. The illumination provided from the illumination modules 120 could end after an exposure time has elapsed. In the case of a rolling shutter-type image sensor, the illumination modules 120 could be triggered to begin illuminating the scene when the image capture is triggered, but the illumination level will generally be maintained until all of the rows of the image sensor have been scanned. In such scenarios, the illumination modules 120 could be kept on (e.g., illuminated) for an exposure time+(a number of rows*readout time per row) (potentially plus some buffering time).

In some embodiments, the controller 150 could be configured to adjust a current and/or voltage signal provided to the illumination module 120 and/or specific light-emitter devices 122 to control their operation. For example, by adjusting a current and/or voltage input to the illumination module 120, the emitted light intensity could be controllably varied. In some embodiments, the controller 150 could be operable to adjust an overall light intensity of the illumination modules 120 while maintaining a consistent overall light emission pattern. In yet other embodiments, the controller 150 could be operable to maintain the light emission pattern at substantially all times. It will be understood that other ways to control the illumination modules 120 are possible and contemplated.

The light intensity output of the illumination module 120 and/or specific light-emitter devices 122 could be controlled by way of continuous (DC) mode or a pulse-width modulation (PWM) mode. If a PWM mode is utilized with a rolling shutter-type image sensor, a frequency of the modulation of the respective light-emitter devices 122 should be high enough so that all of the image sensor pixels will be illuminated for their respective exposure and readout times.

For a system that includes multiple cameras 110, illumination intensity could be controlled on a per camera basis. As background, the closer an object is from the camera, the more light it will generally receive from the illumination modules 120. For example, for an object at 1 meter and an object at 3 meter, there are cases for which the dynamic range of the camera might not be enough (even in HDR mode) to be able to properly expose the 2 objects without saturating or under exposing them. However, by dynamically controlling the illumination intensity, the camera 110 can capture a first image with a well-exposed 1-meter object under a first illumination intensity and capture a second image with a well-exposed 3-meter object under a second illumination intensity. This control can also be performed by changing the camera settings when the intensity is not modifiable (e.g., changing the gain and/or exposure time).

While illumination intensity could be controlled in an "open-loop" fashion, some embodiments may include a "closed-loop" illumination intensity control. For example, prior images could be utilized to determine an adjustment amount to change the illumination intensity. For example, if a target object in a prior image is over- or under-exposed, the controller 150 could adjust a continuous voltage/current signal and/or a pulse-width modulation signal so as to adjust the illumination intensity provided by the illumination modules 120 so as to properly expose the target object in subsequent images. Other ways to utilize feedback to make changes in the illumination intensity are possible and contemplated.

In some embodiments, the camera 110 could operate at 10 Hz (e.g., 10 frames per second) and, in some cases, may run at all times. Within the scope of the present disclosure, the images from the camera 110 can be used in multiple ways to detect certain target objects. For instance, in some embodiments, a perception module could run one or more image classifier routines on images captured by the camera 110 to detect pedestrians, vehicles, obstacles, or other important objects. Such cameras and optical systems may help augment various applications, such as autonomous vehicles and/or machine vision. As an example, images captured by the camera 110 could be utilized to identify objects and understand if the autonomous vehicle can proceed safely. For example, the systems and methods described herein could help the perception module of an autonomous vehicle distinguish between vegetation and a pedestrian.

FIG. 2A illustrates a side or cross-sectional view of an optical system 200, according to an example embodiment. Optical system 200 could be similar or identical to optical system 100 as illustrated and described in reference to FIG. 1. For example, optical system 200 includes a camera 110 having an outer lens element 112 and an image sensor 116.

Optical system 200 also includes a first illumination module 120a and a second illumination module 120b. As illustrated, the first illumination module 120a includes two light-emitting devices 122a and 122b and secondary optical elements 124a and 124b. Furthermore, the second illumination module 120b includes two light-emitting devices 122c and 122d and secondary optical elements 124c and 124d.

The first illumination module 120a and the second illumination module 120b could be attached to the camera 110 by way of a modular attachment structure 130. The modular attachment structure 130 could include, for example, registration surfaces 134a and 134b and/or mounting locations 132a and 132b.

FIG. 2B illustrates the optical system 200 of FIG. 2A, according to an example embodiment. Specifically, FIG. 2B illustrates the respective emission angles of the light-emitter devices 122a-d. For example, light-emitter device 122a has an emission cone 125a, light-emitter device 122b has an emission cone 125b, light-emitter device 122c has an emission cone 125c, and light-emitter device 122d has an emission cone 125d. Furthermore, FIG. 2B illustrates a field of view 115 of camera 110. In some embodiments, emission cones 125a-d could be greater than 170 degrees, although other cone angles are possible and contemplated. Furthermore, while FIG. 2B illustrates "symmetric" emission cones, it will be understood that different arrangements and different types of emission cones are possible and contemplated. For example, the emission cones could be asymmetric (e.g., a flattened cone shape with wider angle coverage in azimuth than in elevation) so as to illuminate a wider azimuthal field of view. In some embodiments, a plurality of light-emitter devices 122 and/or illumination modules 120 each having an asymmetrical emission cone could be combined so as to provide a substantially symmetric light emission pattern with respect to the camera 110. In one such scenario, three illumination modules 120 with individually asymmetric light emission patterns could be arranged so as to provide a symmetric light emission pattern about the optical axis 114 of the camera 110.

Figure 3A:
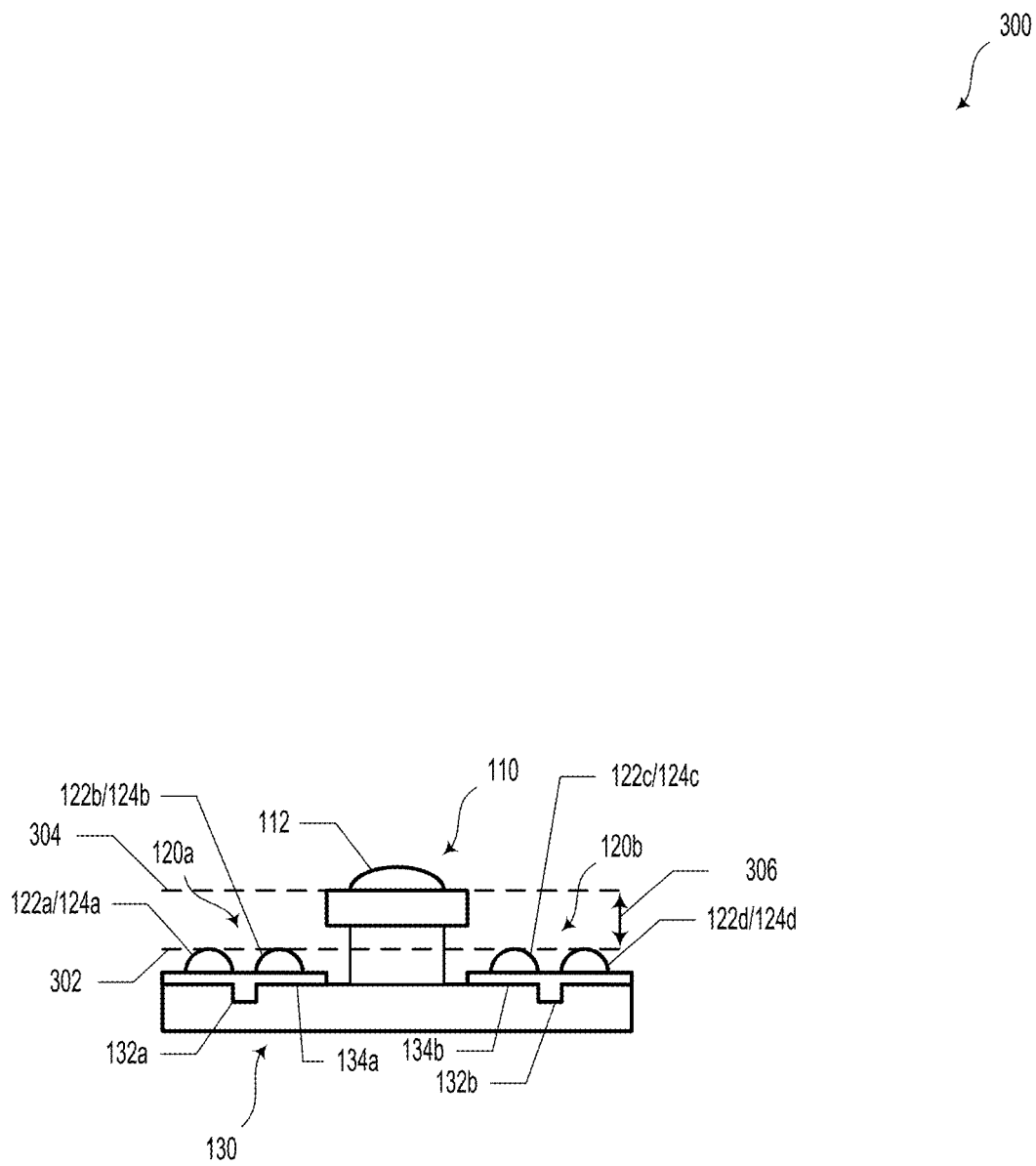
FIG. 3A illustrates an optical system, according to an example embodiment.
Figure 3B:
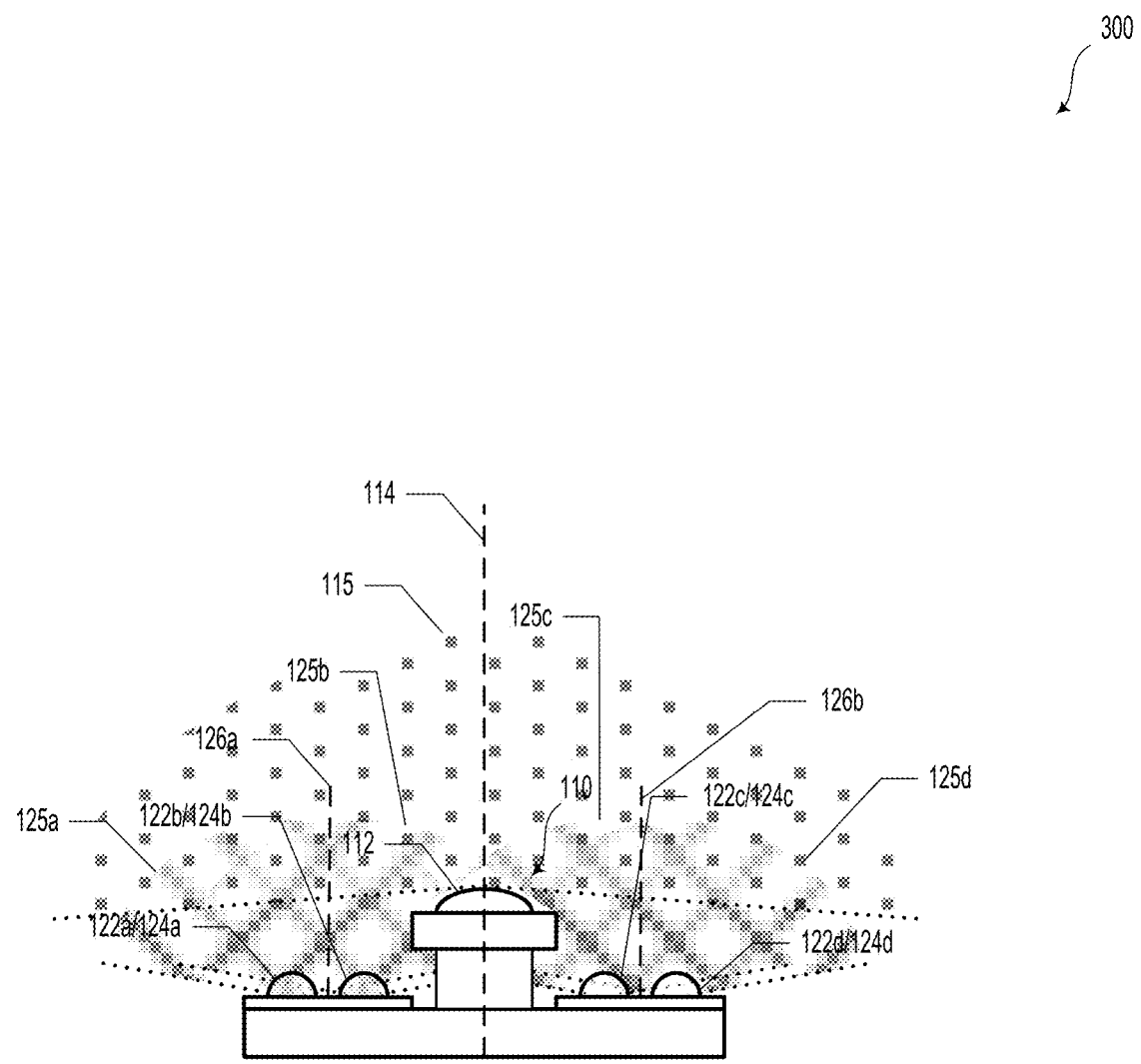
FIG. 3B illustrates the optical system of FIG. 3A, according to an example embodiment.

FIGS. 3A and 3B illustrate an optical system 300, according to an example embodiment. Optical system 300 could be similar or identical in various respects to optical systems 100 and 200 as illustrated and described in relation to FIGS. 1, 2A, and 2B. However, in contrast to optical system 200, optical system 300 could include the illumination modules 120a and 120b having emission axes 126a and 126b that are substantially parallel to the optical axis 114 of the camera 110 (as shown in FIG. 3B). That is, the light-emitter devices 122a-d could be arranged substantially along a plane 302, which could be parallel to plane 304, defined by the camera 110 and/or the outer lens element 112 (as shown in FIG. 3A).

In some embodiments, the light-emitter devices 122a-d could be recessed from the plane 304 by a recess distance 306, which could be between 0 and 50 mm or more. Other recess distances are contemplated and possible. In some examples, the recess distance 306 could be selected based on a field of view extent of the camera 110. For instance, the recess distance 306 could be selected to be 50 mm for a very wide field of view camera (e.g., 220 degree azimuthal angle extent). As described herein, recessing the light-emitter devices 122a-d from the outer lens element 112 could reduce the amount of stray illumination light received by the camera 110.

FIG. 3B shows the respective emission angles of the light-emitter devices 122a-d. For example, light-emitter device 122a has an emission cone 125a, light-emitter device 122b has an emission cone 125b, light-emitter device 122c has an emission cone 125c, and light-emitter device 122d has an emission cone 125d. Furthermore, FIG. 3B illustrates a field of view 115 of camera 110. In some embodiments, emission cones 125a-d could be greater than 170 degrees, although other cone angles are possible and contemplated.

In some embodiments, one or more optical systems 100 could be attached or otherwise mounted to a vehicle, as described below.

III. Example Vehicles

Figure 4:
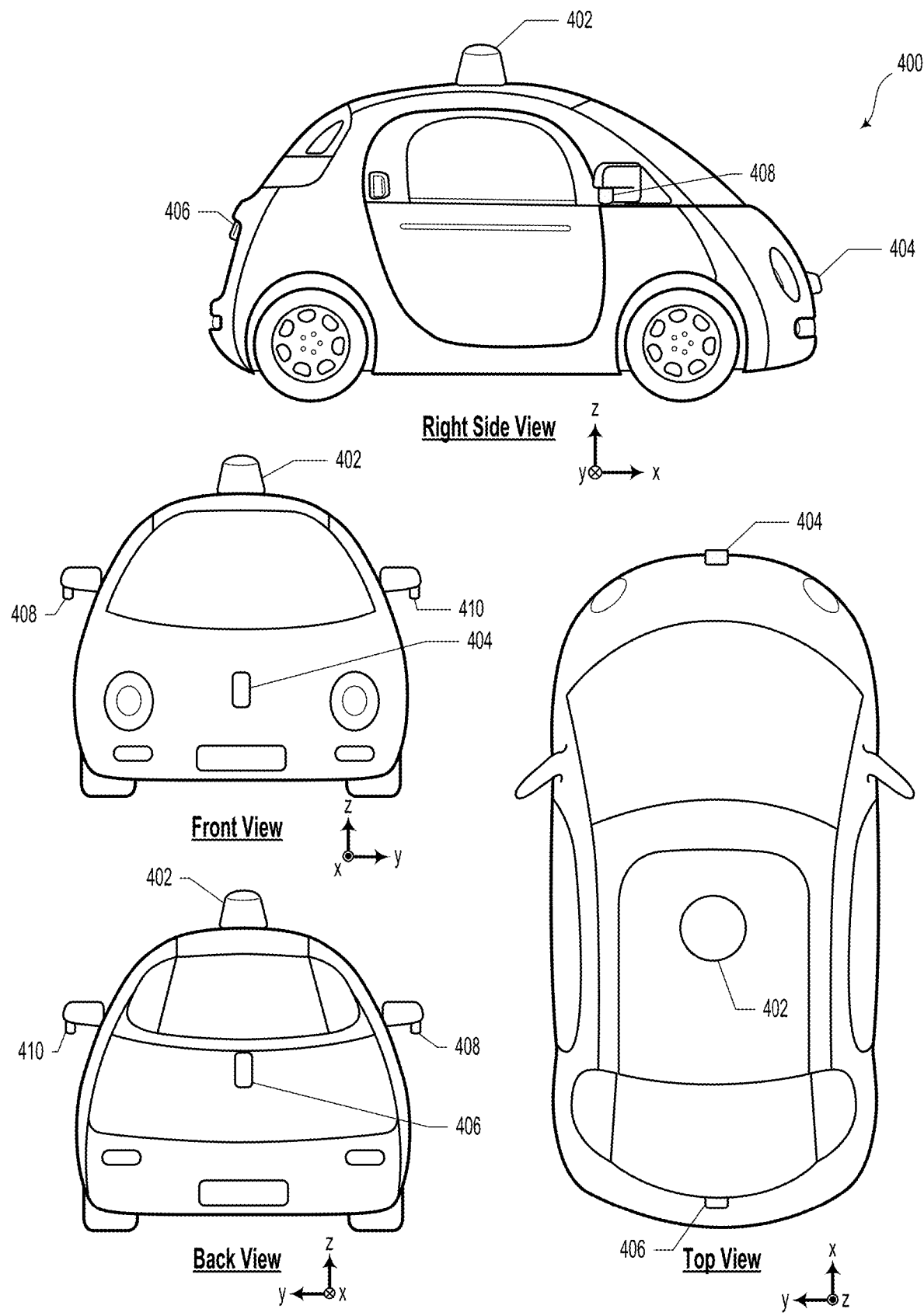
FIG. 4 illustrates a vehicle, according to an example embodiment.

FIG. 4 illustrates a vehicle 400, according to an example embodiment. In some embodiments, the vehicle 400 could be a semi- or fully-autonomous vehicle. While FIG. 4 illustrates vehicle 400 as being an automobile (e.g., a car), it will be understood that vehicle 400 could include another type of autonomous vehicle, robot, or drone that can navigate within its environment using sensors and other information about its environment.

The vehicle 400 may include one or more sensor systems 402, 404, 406, 408, and 410. Some embodiments, sensor systems 402, 404, 406, 408, and 410 could include LIDAR sensors having a plurality of light-emitter devices arranged over a range of angles with respect to a given plane (e.g., the x-y plane).

One or more of the sensor systems 402, 404, 406, 408, and 410 may be configured to rotate about an axis (e.g., the z-axis) perpendicular to the given plane so as to illuminate an environment around the vehicle 400 with light pulses. Based on detecting various aspects of reflected light pulses (e.g., the elapsed time of flight, polarization, etc.,), information about the environment may be determined.

In an example embodiment, sensor systems 402, 404, 406, 408, and 410 may be configured to provide respective point cloud information that may relate to physical objects within the environment of the vehicle 400. While vehicle 400 and sensor systems 402 and 404 are illustrated as including certain features, it will be understood that other types of sensor systems are contemplated within the scope of the present disclosure.

An example embodiment may include a system having a plurality of light-emitter devices. The system may include a transmit block of a LIDAR device. For example, the system may be, or may be part of, a LIDAR device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane, as described elsewhere herein. In some embodiments, the reference plane may be based on an axis of motion of the vehicle 400.

While LIDAR systems with multiple light-emitter devices are described and illustrated herein, LIDAR systems with fewer light-emitter devices (e.g., a single light-emitter device) are also contemplated herein. For example, light pulses emitted by a laser diode may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the LIDAR system or from a surface (e.g., a front bumper) of a given vehicle supporting the LIDAR system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

In some embodiments, the spectral emission of the light-emitter devices 122 could be configured and/or selected so as to avoid the wavelength or wavelengths utilized by the LIDAR sensors. For example, the LIDAR sensors could utilize various infrared wavelengths, such as 905 nm and/or 1050 nm. In such scenarios, the light-emitter devices 122 could be selected so as to emit light at a different wavelength (e.g., 850 nm) so as to minimize or eliminate cross-talk or optical interference between the two types of sensor systems. Furthermore, the temporal characteristics of the light emitted from the light-emitter devices 122 could be configured to be distinguishable from that of LIDAR light pulses. For example, the light-emitter devices 122 could emit light pulses with substantially longer "turn-on" times (e.g., microseconds or milliseconds) as compared to several nanosecond-range laser diode pulses utilized for LIDAR sensing. Additionally or alternatively, the duty cycle of the light-emitter devices 122 (e.g., greater than 20% duty cycle) could be distinguishable from LIDAR laser diode pulses (e.g., less than 5% duty cycle).

While FIG. 4 illustrates various LIDAR sensors attached to the vehicle 400, it will be understood that the vehicle 400 could incorporate other types of sensors, such as a plurality of cameras and corresponding illumination modules, as described below. Additionally or optionally, the light emissions from the illumination modules 120 and/or the LIDAR light pulses could be adjusted and/or regulated by system hardware and/or software so as to comply with local, federal, and/or international eye safety conventions, laws, and/or regulations.

Figure 5:
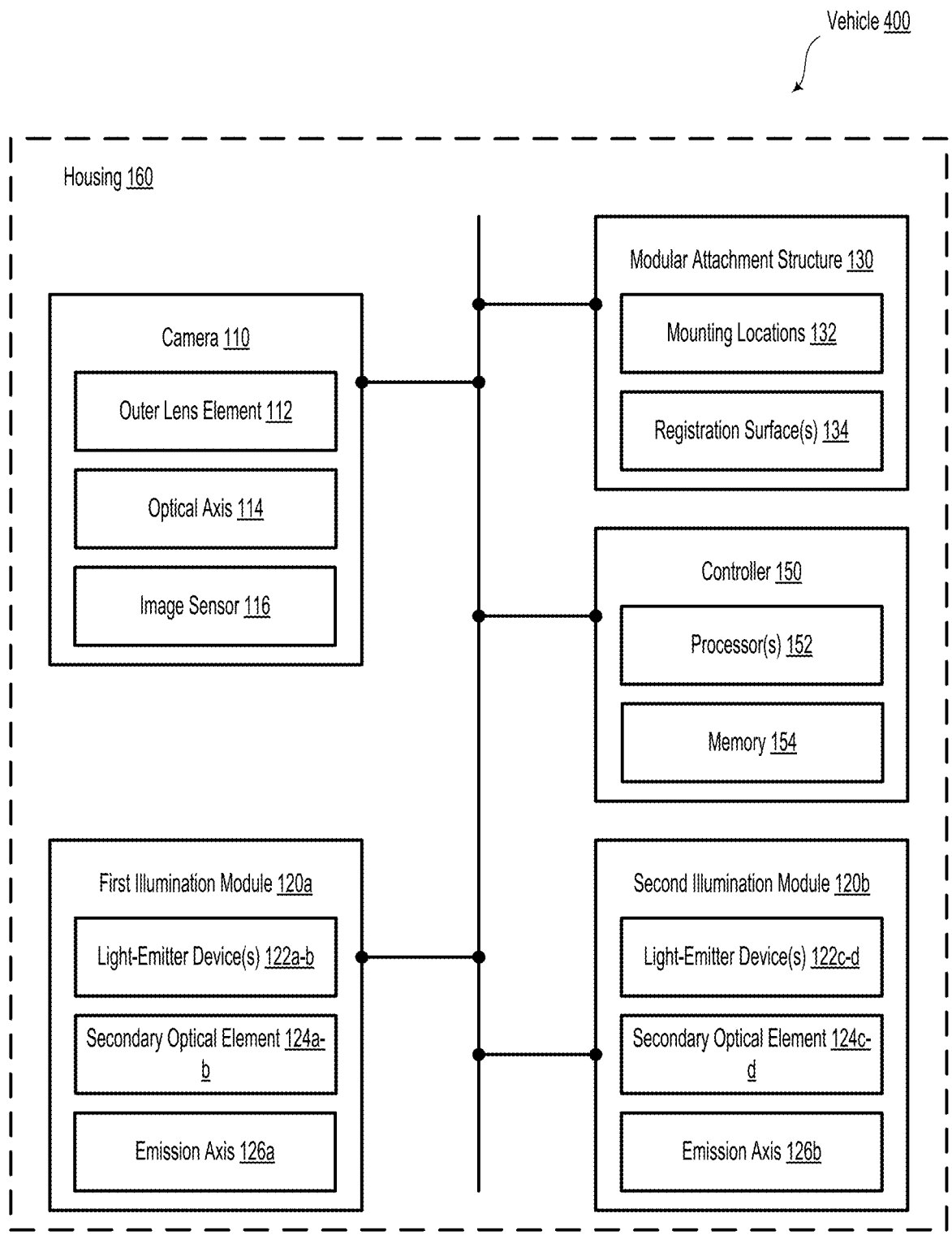
FIG. 5 illustrates a vehicle, according to an example embodiment.

FIG. 5 illustrates the vehicle 400 of FIG. 4, according to an example embodiment. In some embodiments, the vehicle 400 could include one or more instances of optical system 100 as illustrated and described in reference to FIGS. 1, 2A, 2B, 3A, and/or 3B. For example, the vehicle 400 could include a camera (e.g., camera 110 as illustrated in FIGS. 1, 2A, 2B, 3A, and/or 3B). In such examples, the camera 110 includes an optical axis 114 and an outer lens element 112 disposed along the optical axis 114. The vehicle 400 may also include a first illumination module (e.g., illumination module 120a) configured to illuminate a first portion of an environment of the vehicle 400. The vehicle 400 may additionally include a second illumination module (e.g., illumination module 120b), which could be configured to illuminate a second portion of the environment of the vehicle 400.

In such embodiments, each illumination module 120 could include at least one light-emitter device (e.g., light-emitter devices 122a-b and/or 122c-d) configured to emit light along a respective emission axis (e.g., emission axis 126a or 126b).

In some embodiments, each illumination module 120 could include a secondary optical element 124 optically coupled to the at least one light-emitter device 122, wherein the secondary optical element 124 is configured to provide a light emission pattern having an azimuthal angle extent of at least 170 degrees so as to illuminate a portion of an environment of the vehicle 400. It will be understood that light emission patterns with different azimuthal angle extents are possible. For example, the light emission pattern could have an azimuthal angle extent of 30 degrees, 45 degrees, 90 degrees, 120 degrees, 270 degrees, or 360 degrees. Other azimuthal angle extents are possible and contemplated.

The first illumination module 120a and the second illumination module 120b could be arranged opposite one another with respect to the optical axis 114 of the camera 110 such that the respective emission axes 126 of the first illumination module 120a and second illumination module 120b are tilted in opposite directions with respect to the optical axis 114. For example, emission axis 126a could be tilted five degrees away from the optical axis 114. In such a scenario, emission axis 126b could be tilted five degrees in the opposite direction from the optical axis 114.

It will be understood that other tilt angles are possible and contemplated. For example, the first illumination module 120a and the second illumination module 120b could have a tilt angle with respect to the optical axis that is within a range from 5 degrees to 20 degrees or from 0 degrees to 45 degrees.

As described herein, the light emission pattern provided by the illumination modules 120 could be configured to provide an illumination intensity that is at least 70% uniform within a field of view of the illumination modules 120 at a predetermined distance (e.g., 5, 10, 20, or 30 meters) from the optical system 100.

In some example embodiments, vehicle 400 could include a modular attachment structure 130 configured to interchangeably couple the plurality of illumination modules 120 to the camera 110 such that each respective emission axis 126 forms a non-zero tilt angle with respect to the optical axis 114. As an example embodiment, each of the first illumination module 120a and the second illumination module 120b could be configured to interchangeably couple to each of a plurality of mounting locations 132 on the modular attachment structure 130.

Additionally or alternatively, the modular attachment structure 130 could include at least one registration surface 134. The at least one registration surface 134 could be configured to position an illumination module 120 according to at least one of: a known or desired orientation, a known or desired physical alignment position, and/or a known or desired optical alignment position.

In some embodiments described herein, the vehicle 400 could include a controller (e.g., controller 150), which may include at least one processor and a memory. The controller could be configured to execute instructions stored in the memory so as to carry out operations. For example, the operations could include causing the at least one light-emitter device of at least one illumination module to emit light according to the light emission pattern. The light could include light having a wavelength of 850 nm (e.g., light with wavelength(s) between 840 nm and 860 nm.

In example embodiments, the operations could include causing the camera (e.g., camera 110) to capture at least one image of the portion of the environment.

Figure 6:
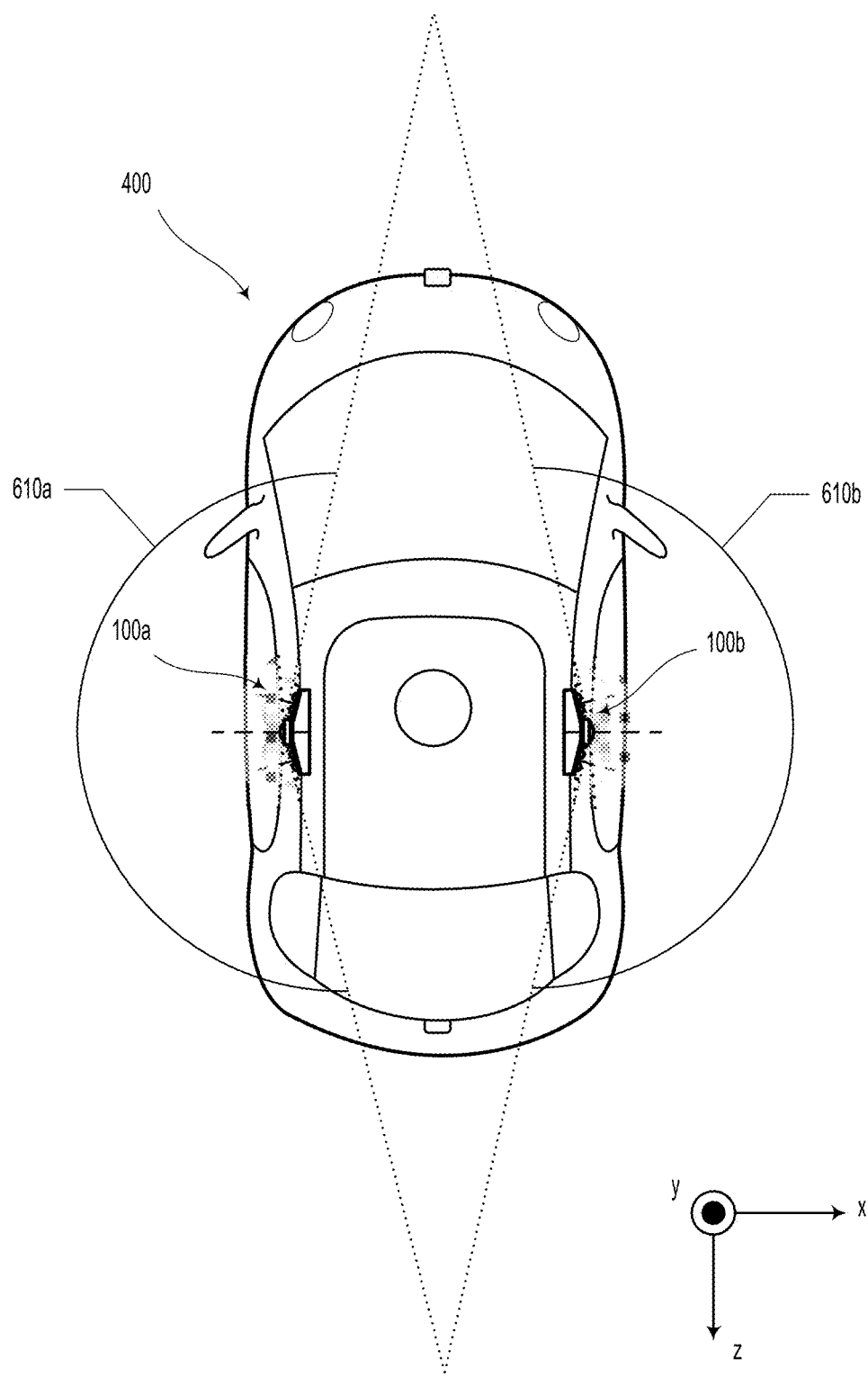
FIG. 6 illustrates a vehicle, according to an example embodiment.

FIG. 6 illustrates a vehicle 400, according to an example embodiment. As illustrated, vehicle 400 could include a first optical system 100a and a second optical system 100b. The first optical system 100a could be attached to a left side of the vehicle 400 and the second optical system 100b could be attached to a right side of the vehicle 400. It will be understood that other arrangements of the respective optical systems are possible and contemplated. For example, the optical systems could be mounted in front/rear arrangement. Additionally or alternatively, while two optical systems are illustrated, it will be understood that more or fewer optical systems could be utilized with vehicle 400.

As illustrated in FIG. 6, the respective fields of view of the optical systems 100a and 100b could overlap in azimuth so that two optical systems could provide 360 degree imaging around the vehicle 400. That is, field of view 610a associated with optical system 100a and field of view 610b associated with optical system 100b could overlap a few meters in front of the vehicle 400 and a few meters behind the vehicle 400. In such a manner, the two camera systems could provide 360 degree azimuthal coverage around the vehicle 400.

In some embodiments, certain operations of the optical systems 100a and/or 100b could be based on operations of the vehicle 400. For example, the operations could include, while the vehicle 400 is operating below a threshold velocity (e.g., 25 miles per hour), operating the at least one light-emitter device 122 or the at least one illumination module 120 to emit light according to the light emission pattern. In such a scenario, the operations could also include, while the vehicle 400 is operating at or above the threshold velocity, discontinuing operation of the at least one light-emitter device 122 and the at least one illumination module 120. In some embodiments, the threshold velocity could be a velocity between 10 and 30 miles per hour.

While the example embodiments described above relate to vehicles, it will be understood that the optical systems and methods could be applied in other contexts. For example, the described optical systems could be utilized for security applications (e.g., surveillance and/or safety applications). Additionally or alternatively, the optical systems and methods could be applied within the context of photography, videography, remote monitoring, among other possibilities.

IV. Example Methods

Figure 7:
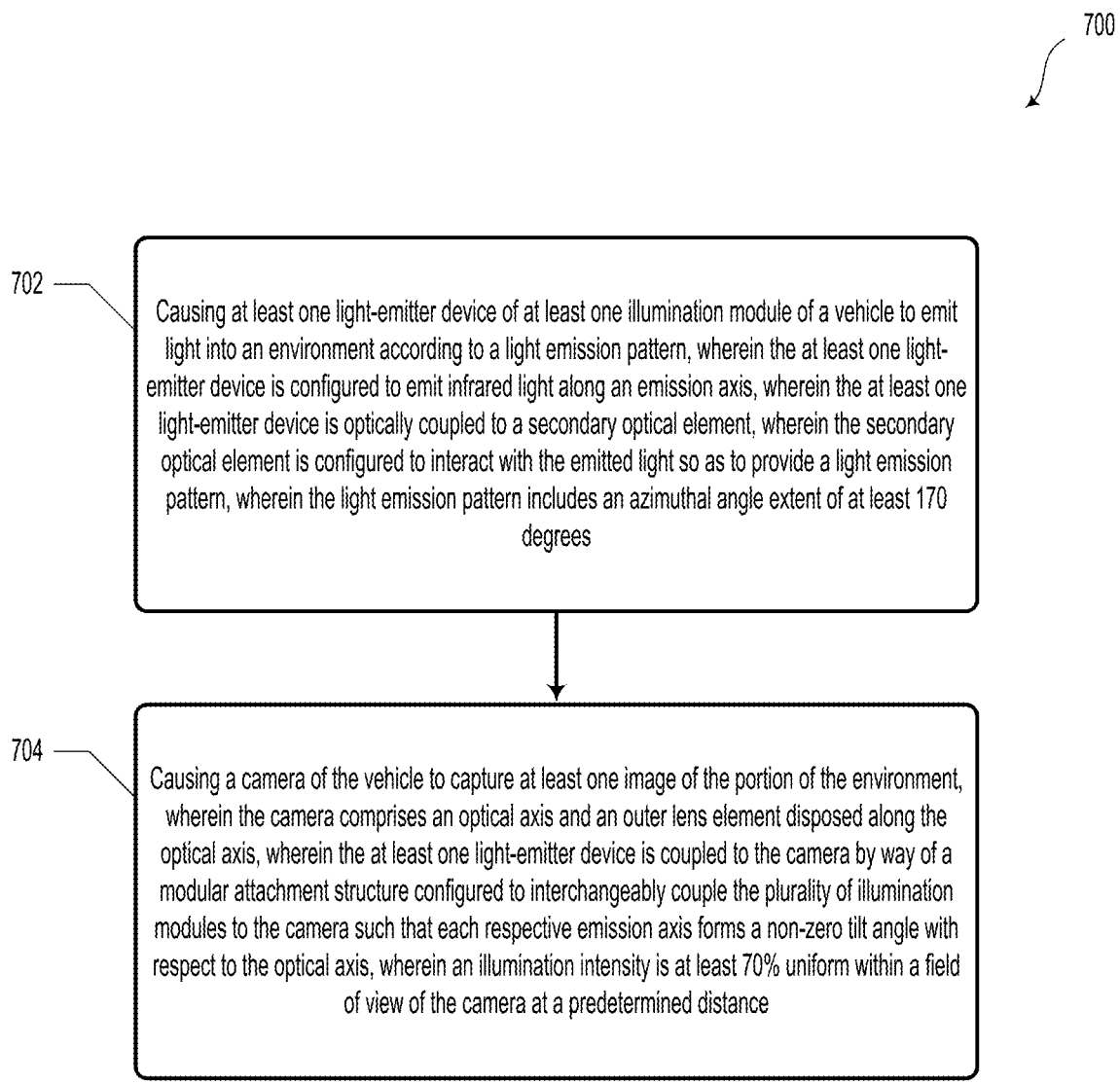
FIG. 7 illustrates a method, according to an example embodiment.

FIG. 7 illustrates a method 700, according to an example embodiment. It will be understood that the method 700 may include fewer or more steps or blocks than those expressly illustrated or otherwise disclosed herein. Furthermore, respective steps or blocks of method 700 may be performed in any order and each step or block may be performed one or more times. In some embodiments, some or all of the blocks or steps of method 700 may be carried out by controller 150 and/or other elements of optical system 100 and/or vehicle 400 as illustrated and described in relation to FIGS. 1, 2A, 2B, 3A, 3B, 4, 5, and 6.

Block 702 includes causing at least one light-emitter device of at least one illumination module of a vehicle to emit light into an environment according to a light emission pattern. The light emission pattern could correspond to a spatial illumination pattern and/or a temporal pattern (e.g., 2 kHz light pulse emission rate). In an example embodiment, the spatial illumination pattern could include a substantially uniform illumination intensity over a broad angle range (e.g., 170 degree cone angle). For example, the illumination intensity could be at least 70% uniform across the emission cone angle.

The at least one light-emitter device is configured to emit light along an emission axis. In such scenarios, the at least one light-emitter device is optically coupled to a secondary optical element. The secondary optical element is configured to interact with the emitted light so as to provide a light emission pattern. The light emission pattern includes an azimuthal angle extent of at least 170 degrees.

Block 704 includes causing a camera of the vehicle to capture at least one image of the portion of the environment. The camera includes an optical axis and an outer lens element disposed along the optical axis. The at least one light-emitter device is coupled to the camera by way of a modular attachment structure configured to interchangeably couple the plurality of illumination modules to the camera such that each respective emission axis forms a non-zero tilt angle with respect to the optical axis. In such examples, an illumination intensity (e.g., of the emitted light) is at least 70% uniform within a field of view of the illumination modules at a predetermined distance (e.g., 3 meters).

The relative illumination uniformity across the field of view of the illumination modules may provide improved imaging performance and object recognition based on the images captured by the camera. Providing a uniform illumination intensity across a ~170 degree cone may additionally help reduce the negative effects of retroreflectors by more evenly distributing illumination light throughout the field of view, instead of concentrating it in a narrower cone.

In some embodiments, the method could include, while the vehicle is operating below a threshold velocity, operating the at least one light-emitter device or the at least one illumination module to emit light according to the light emission pattern. The light could include light having a wavelength of around 850 nm.

Additionally or alternatively, the method could include while the vehicle is operating at or above a threshold velocity, discontinuing operation of the at least one light-emitter device and the at least one illumination module. In some embodiments, the threshold velocity could be between 10 and 30 miles per hour. However, other threshold velocities are possible and contemplated.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
 a camera, wherein the camera comprises an optical axis and an outer lens element disposed along the optical axis; and
 a plurality of illumination modules, wherein each illumination module comprises:
  at least one light-emitter device configured to emit light along a respective emission axis; and
  a secondary optical element optically coupled to the at least one light-emitter device, wherein the secondary optical element is configured to provide a light emission pattern so as to illuminate a portion of an environment of the optical system, wherein the plurality of illumination modules comprises a first illumination module and a second illumination module, wherein the first illumination module and the second illumination module are arranged on opposite sides of the optical axis of the camera such that the respective emission axes of the first illumination module and second illumination module are not parallel with respect to the optical axis.

2. The optical system of claim 1, further comprising a housing, wherein an outer surface of each light-emitter device is recessed between 0 millimeters to 50 millimeters with respect to a plane perpendicular to the optical axis and that intersects the outer lens element of the camera.

3. The optical system of claim 1, wherein the first illumination module and the second illumination module are arranged opposite one another with respect to the optical axis of the camera such that the respective emission axes of the first illumination module and second illumination module are tilted in opposite directions with respect to the optical axis.

4. The optical system of claim 1, wherein the first illumination module and the second illumination module each have a tilt angle with respect to the optical axis that is within a range from 5 degrees to 20 degrees.

5. The optical system of claim 1, wherein the light emission pattern has an azimuthal angle extent of at least 170 degrees, wherein the light emission pattern provides an illumination intensity that is at least 70% uniform within a field of view of the camera at a predetermined distance from the optical system.

6. The optical system of claim 1, further comprising a modular attachment structure configured to interchangeably couple the plurality of illumination modules to the camera such that each respective emission axis forms a non-zero tilt angle with respect to the optical axis, wherein each illumination module of the plurality of illumination modules is configured to interchangeably couple to each of a plurality of mounting locations on the modular attachment structure, wherein the modular attachment structure comprises at least one registration surface, wherein the at least one registration surface is configured to position an illumination module according to at least one of: a known orientation, a known physical alignment position, and/or a known optical alignment position.

7. The optical system of claim 1, further comprising a controller comprising at least one processor and a memory, wherein the controller is configured to execute instructions stored in the memory so as to carry out operations, the operations comprising:
 causing the at least one light-emitter device of at least one illumination module to emit light according to the light emission pattern, wherein the light comprises light having a wavelength of 850 nm; and
 causing the camera to capture at least one image of the portion of the environment.

8. The optical system of claim 7, wherein the operations further comprise:
 operating the optical system in a first operating mode;
 receiving information indicative of an operating temperature of the optical system;
 determining that the optical system is operating at an elevated temperature, wherein the elevated temperature comprises an operating temperature of the optical system above a predetermined threshold temperature; and
 in response to determining the optical system is operating at an elevated temperature, operating the optical system in a second operating mode.

9. The optical system of claim 8, wherein operating the optical system in the second operating mode comprises at least one of:
 operating the plurality of illumination modules at a reduced illumination rate;
 operating the plurality of illumination modules at a reduced illumination intensity; or
 operating a reduced set of the plurality of illumination modules or a reduced set of the plurality of light-emitter devices.

10. The optical system of claim 7, wherein the operations further comprise:
 synchronously operating the camera and the plurality of illumination modules based on one or more focal plane shutter times associated with the camera.

11. A vehicle comprising:
 a camera, wherein the camera comprises an optical axis and an outer lens element disposed along the optical axis;
 a first illumination module configured to illuminate a first portion of an environment of the vehicle; and
 a second illumination module configured to illuminate a second portion of the environment of the vehicle, wherein each illumination module comprises:
  at least one light-emitter device configured to emit light along a respective emission axis; and
  a secondary optical element optically coupled to the at least one light-emitter device, wherein the secondary optical element is configured to provide a light emission pattern so as to illuminate a portion of an environment of the vehicle, wherein the first illumination module and the second illumination module are arranged on opposite sides of the optical axis of the camera such that the respective emission axes of the first illumination module and second illumination module are not parallel with respect to the optical axis.

12. The vehicle of claim 11, wherein the first illumination module and the second illumination module are arranged opposite one another with respect to the optical axis of the camera such that the respective emission axes of the first illumination module and second illumination module are tilted in opposite directions with respect to the optical axis.

13. The vehicle of claim 11, wherein the first illumination module and the second illumination module each have a tilt angle with respect to the optical axis that is within a range from 5 degrees to 20 degrees.

14. The vehicle of claim 11, wherein the light emission pattern has an azimuthal angle extent of at least 170 degrees, wherein the light emission pattern provides an illumination intensity that is at least 70% uniform within a field of view of the camera at a predetermined distance from the optical system.

15. The vehicle of claim 11, further comprising a modular attachment structure configured to interchangeably couple the plurality of illumination modules to the camera such that each respective emission axis forms a non-zero tilt angle with respect to the optical axis, wherein each of the first illumination module and the second illumination module is configured to interchangeably couple to each of a plurality of mounting locations on the modular attachment structure.

16. The vehicle of claim 15, wherein the modular attachment structure comprises at least one registration surface, wherein the at least one registration surface is configured to position an illumination module according to at least one of: a known orientation, a known physical alignment position, and/or a known optical alignment position.

17. The vehicle of claim 11, further comprising a controller having at least one processor and a memory, wherein the controller executes instructions stored in the memory so as to carry out operations, the operations comprising:
  causing the at least one light-emitter device of at least one illumination module to emit light according to the light emission pattern, wherein the light comprises light having a wavelength of 850 nm; and
  causing the camera to capture at least one image of the portion of the environment.

18. The vehicle of claim 17, wherein the operations further comprise:
  while the vehicle is operating below a threshold velocity, operating the at least one light-emitter device or the at least one illumination module to emit light according to the light emission pattern; and
  while the vehicle is operating at or above a threshold velocity, discontinuing operation of the at least one light-emitter device and the at least one illumination module, wherein the threshold velocity is between 10 and 30 miles per hour.

19. A method comprising:
  causing at least one light-emitter device of at least one illumination module of a vehicle to emit light into an environment according to a light emission pattern, wherein the at least one light-emitter device is configured to emit light along an emission axis, wherein the at least one light-emitter device is optically coupled to a secondary optical element, wherein the secondary optical element is configured to interact with the emitted light so as to provide a light emission pattern; and
  causing a camera of the vehicle to capture at least one image of the portion of the environment, wherein the camera comprises an optical axis and an outer lens element disposed along the optical axis, wherein the at least one light-emitter device is coupled to the camera by way of a modular attachment structure configured to interchangeably couple the plurality of illumination modules to the camera such that each respective emission axis forms a non-zero tilt angle with respect to the optical axis, wherein an illumination intensity is at least 70% uniform within a field of view of the illumination modules at a predetermined distance.

20. The method of claim 19, further comprising:
  while the vehicle is operating below a threshold velocity, operating the at least one light-emitter device or the at least one illumination module to emit light according to the light emission pattern, wherein the light emission pattern includes an azimuthal angle extent of at least 170 degrees, wherein the light comprises light having a wavelength of 850 nm; and
  while the vehicle is operating at or above a threshold velocity, discontinuing operation of the at least one light-emitter device and the at least one illumination module, wherein the threshold velocity is between 10 and 30 miles per hour.

* * * * *